United States Patent
Hortensius et al.

(10) Patent No.: US 6,252,854 B1
(45) Date of Patent: Jun. 26, 2001

(54) RATE SELECTION IN ADAPTIVE DATA RATE SYSTEMS

(75) Inventors: Peter Dirk Hortensius, Goldens Bridge; Parviz Kermani, South Salem; Babak Rezvani, Port Chester; Mahmoud Naghshineh, Fishkill; Claus Michael Olsen, Cortlandt Manor, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/966,914

(22) Filed: Nov. 12, 1997

Related U.S. Application Data

(63) Continuation-in-part of application No. 08/664,718, filed on Jun. 17, 1996, now Pat. No. 5,818,826.

(51) Int. Cl.$^7$ .................................................. G01R 31/08
(52) U.S. Cl. ......................................... 370/252; 370/468
(58) Field of Search .................................... 370/312, 320, 370/342, 365, 441, 468, 252; 714/704, 705, 706

(56) References Cited

U.S. PATENT DOCUMENTS

| | | |
|---|---|---|
| 4,606,044 | 8/1986 | Kudo . |
| 4,890,316 | 12/1989 | Walsh et al. . |
| 5,488,609 * | 1/1996 | Hluchyj et al. ...................... 370/84 |
| 5,491,720 | 2/1996 | Davis et al. . |
| 5,524,122 | 6/1996 | Lepitre et al. . |
| 5,537,410 | 7/1996 | Li . |
| 5,541,955 | 7/1996 | Jacobsmeyer . |
| 5,563,910 | 10/1996 | Mellone et al. . |
| 5,566,206 | 10/1996 | Butler et al. . |
| 5,706,428 * | 1/1998 | Boer et al. .......................... 395/200 |
| 5,818,826 * | 10/1998 | Gfeller et al. ....................... 370/342 |

* cited by examiner

*Primary Examiner*—Chau Nguyen
*Assistant Examiner*—Alexander Boakye
(74) *Attorney, Agent, or Firm*—McGuireWoods; Douglas W. Cameron

(57) ABSTRACT

Rate management in adaptive data rate wireless communication systems in which communicating stations move with respect to one another implements algorithms for calculation of the repetition rate. A rate management module is used for selecting a proper value of repetition rate to be communicated back to sending station and for a selecting proper value of repetition rate to encode the data at the sending station. The repetition rate calculation procedure enables each station to dynamically calculate the optimum rate with which each station should be receiving information from another station. The repetition rate calculation procedures take into consideration past and present measurements of the link quality, age of the link quality measurements, speed of change in the link quality, packet types, packet lengths, received signal strength, and pattern and correlation in the link quality measurements. The rate management module utilizes one or more tables which are accessible from either hardware or software.

20 Claims, 2 Drawing Sheets

RATE SELECTION IN ADAPTIVE DATA RATE SYSTEMS

CROSS-REFERENCE TO RELATED APPLICATION

This application is a continuation-in-part (CIP) of application Ser. No. 08/664,718 filed Jun. 17, 1996, now U.S. Pat. No. 5,818,826 by Fritz R. Gfeller, Peter D. Hortensius, Patrick K. Kam, Parviz Kermani, Danny N. McKay, Mahmoud Naghshineh, Claus M. Olsen and Babak Rezvani for "Media Access Control Protocols in a Wireless Communication Network Supporting Multiple Transmission Rates" and assigned to a common assignee herewith. The disclosure of application Ser. No. 08/664,718 is incorporated herein by reference.

DESCRIPTION

BACKGROUND OF THE INVENTION

1. Field of the Invention

The present invention generally relates to wireless communication systems in which communicating stations move with respect to one another and, more particularly, to data rate management in adaptive data rate wireless communication systems.

2. Background Description

One of the key concerns in wireless communication systems is the sudden loss of a connection between two communicating stations A and B when the two stations move out of reach of each other; i.e., one station's signal gets too weak for the other station to detect above the noise. This problem can to a large extent be overcome by controlling the transmission bandwidth of the physical channel according to the quality of the link. One way of doing this has been proposed by F. Gfeller, W. Hirt, M. De Lange and B. Weiss in "Wireless Infrared Transmission: How to Reach all Office Space", *Proceedings of IEEE VTC*, Atlanta, April 1996, which use repetition coding in conjunction with a Pulse Position Modulation (PPM) format for infrared (IR) wireless systems. According to Gfeller et al., the modems of two communicating stations A and B count the number of PPM symbol errors in each received frame and report the result to the next layer; the medium access (MAC) layer.

Application Ser. No. 08/664,718, supra, describes a MAC protocol utilizing the features of the modem in Gfeller et al. Among other things, application Ser. No. 08/664,718 accounts for the rate selection and exchange protocol. More specifically, the modem of a receiving station passes the number of symbol errors to the rate selection module (RSM) which is in the MAC, the RSM calculates a suggested repetition rate (RR*) which the transmitting station should repeat its symbols with, the RSM calculates RR* based on the number of symbol errors, and the MAC of the receiving station then informs the MAC of the transmitting station about the RR*. The repetition rate with which the transmitting station is actually using for sending out a data packet is denoted RR. The means by which the receiving station informs the transmitting station about the desired rate is by the inclusion of a repetition rate (RR*) parameter in a highly robust part of the response frame sent back to the transmitting station.

The problem that has not yet been solved is how to select RR*. The problem is illustrated with the following example. Suppose two stations, A and B, have established a connection with each other and suppose station B is sending data packets to station A. Every time station A receives a data packet from B, the modem in station A counts the number of symbol errors in the received frame and reports it to the MAC. Suppose now that station A first receives a number of consecutive data packets that are error free and assume that station A calculates RR*=1 (i.e., no repetition of symbols) and reports this value back to station B. Next, station A receives a data packet which has a PPM symbol error rate (SER) of say 10%. From a simplistic point of view, one may jump to the conclusion that RR* should be increased to maximum value, for example RR*=16, and be reported back to station B immediately so the next DATA packets can be received error free. But that would be incorrect to jump to that conclusion for the following reasons. Since the error infected data packet arrives in immediate succession of the many error free data packets, it is more likely that a collision occurred; especially if the data packet is not sent within a reservation but rather as a separate unreserved data packet where the chance of a collision is higher and especially if the data packet is received say less than one second after the last error free packet. Furthermore, suppose the packet length is very short, then the statistical accuracy of the SER is not very good. This simple example shows that there are at least four things that should be considered when calculating the RR* value:

1) the earlier measured values of the SER,
2) the age of earlier measurements,
3) the packet lengths, and
4) the frame types.

The concept of dynamically adjusting the data rate according to link quality is not per se new. U.S. Pat. No. 5,541,955 to Jacobsmeyer discloses means connected to a trellis decoder in a wireless system which estimates a reliable data rate based on channel conditions or based on the amount of information stored at the receiver. Jacobsmeyer uses this estimation means for the sake of combating a fading communication channel. Jacobsmeyer calculates what data rate at which the next packet should be sent and in turn sends this information to the is transmitter on a separate return channel. However, Jacobsmeyer ties the data rate prediction/selection method closely to the trellis decoder based modem and that the selected data rate information is sent back to the transmitter in real time on a separate return channel. Jacobsmeyer does suggest how to predict the next signal-to-noise ratio (SNR) based on a number of previous measurements of the signal quality, but only for the particular wireless system as just described. Jacobsmeyer does not disclose that the predicted data rate should in any way depend on packet or signal properties such as packet length, packet type, signal strength, age of previous measurements, etc., but rather Jacobsmeyer discloses prediction algorithms that attempt to fit the measured SNR onto a linear curve, polynomial curve or a least squares curve. The linear fit algorithm is suitable for a slowly fading communications channel while the polynomial and least squares fit algorithms are suitable for a rapidly fading communications channel.

In U.S. Pat. No. 5,488,609 to Hluchyj et al., the data rate is adjusted according to the load in the network and at the connection level.

In U.S. Pat. No. 5,524,122 to Lepitre et al., the data rate is adjusted according to the quality of the channel where the quality of the channel is a function of the error ratio of the received signal. The Lepitre et al. system is aimed at modem speeds of 20 kbps and below. Lepitre et al. further disclose the rules associated with when to change the data rate. These rules depend on the time duration over which an error level has been detected and whether this error level is greater than a certain upper threshold level and whether this error level is smaller than a certain lower threshold level.

In U.S. Pat. No. 4,890,316 to Walsh et al., the data rate is adjusted according to the quality of the channel where the quality of the channel is estimated according to cyclic redundancy checking (CRC), outcome of retraining attempts and a metric provided by a trellis decoder. The Walsh et al. system is aimed at modem speeds of 10 kbps and below for voice grade telephone circuits.

Another problem that has not been solved is how to most efficiently inform the sending station B about the RR* values calculated by station A. Assume again the two stations, A and B. It is station A which is capable of evaluating the quality of the station B to station A (B→A) link and it is station A which selects RR*. But it is station B that needs to know about RR* so it can adjust the repetition rate, RR, accordingly. Thus, RR* must be communicated to station B as fast as possible, preferably before the next data packet is sent by station B. The general infrastructure needed to perform this function was disclosed in application Ser. No. 08/664,718, supra. What is needed is an infrastructure for reporting RR* back to the sending station which is more efficient than that of application Ser. No. 08/664,718.

SUMMARY OF THE INVENTION

According to the invention, there are provided algorithms for calculation of the repetition rate RR* and a rate management module for selecting proper value of RR* to be communicated back to sending station and for selecting a proper value of RR to encode the data at the sending station.

The RR* calculation procedure enables each station to dynamically calculate the optimum rate with which each station should be receiving information from another station. The RR* calculation procedures take into consideration past and present measurements of the link quality, age of the link quality measurements, speed of change in the link quality, packet types, packet lengths, received signal strength, and pattern and correlation in the link quality measurements.

The rate management module enables a receiving station to properly select an RR* value for the transmitting station and it further enables a transmitting station to evaluate the just received RR* and make a decision regarding which RR value with which to encode the data. The rate management module utilizes one or more tables which are accessible from either hardware or software. In addition, it is composed of one or more functional modules which access and control the content of the tables, and these functions may be implemented in either software or hardware.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF TEE INVENTION

Figure 1:
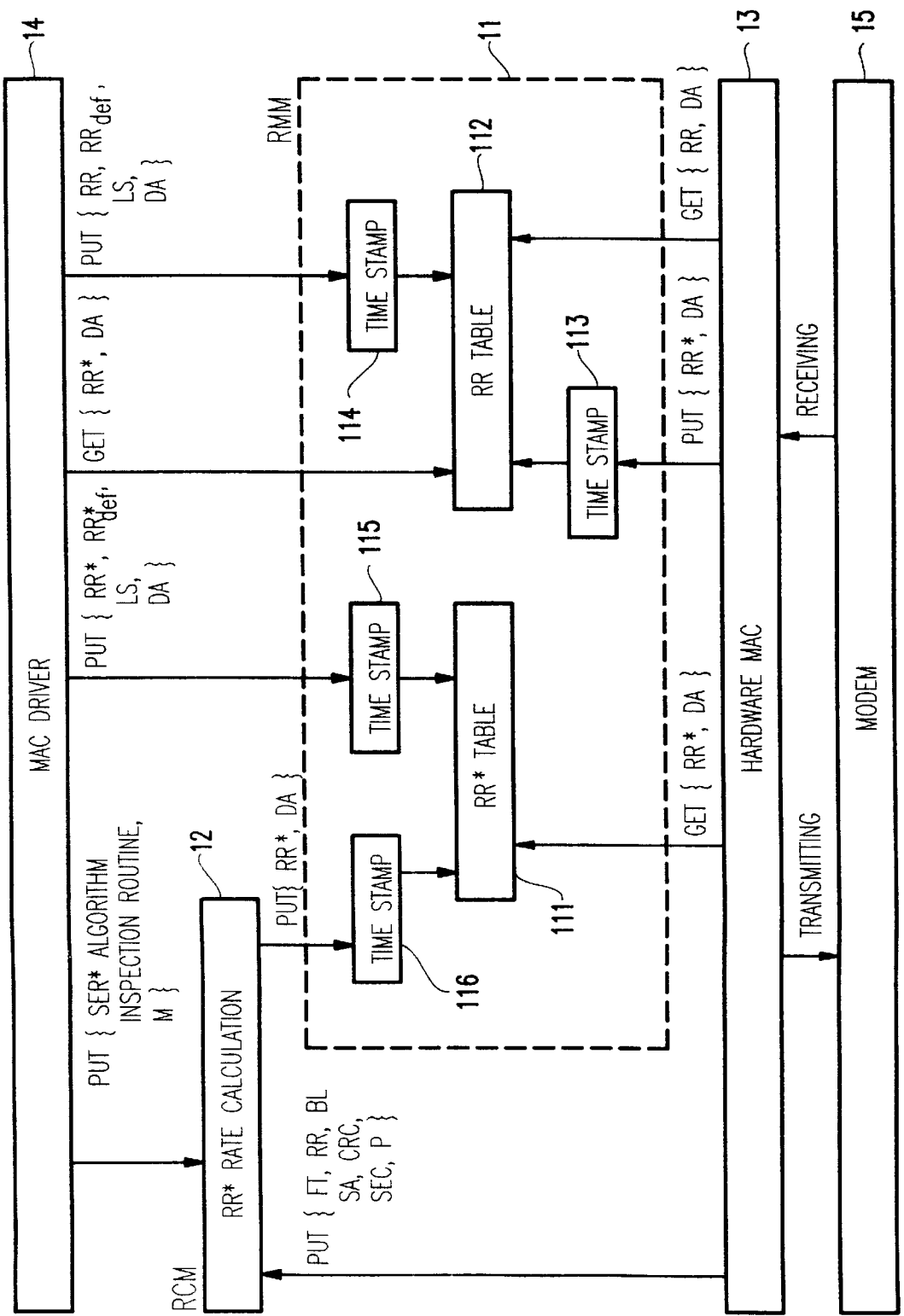
FIG. 1 is a block diagram of the rate calculation/selection architecture according to the intention.

The preferred embodiment of the RR* rate calculation module (RCM) and the rate management module (RMM) is based on the frame structure and MAC protocol in application Serial No. 08/664,718, supra. The MAC protocol of application Ser. No. 08/664,718 uses an initial request-to-send/clear-to-send (RTS/CTS) control frame exchange to establish a reservation among two stations A and B. Say station A has DATA to send to station B, then station A will first launch an RTS frame. Station B in turn replies with a CTS frame to station A, and now station A can start sending the DATA frames to station B. Optionally, station A may request that station B acknowledges the reception of a DATA frame by replying with an acknowledgment (ACK) control frame to station A. Station A terminates the reservation by launching an end-of-burst (EOB) control frame to station B, and station B replies with an end-of-burst-confirm (EOBC) control frame to station A.

Basically, all the control frames are generated and handled entirely in the hardware portion of the MAC, while all the DATA frame manipulation and preparation and initial triggering of the reservation attempt are performed in the MAC driver (the software part of the MAC). The stations A and B above are called reservation participants. Other stations observing the frame exchange between stations A and B are called reservation non-participants (NP). NP stations will remain quiet until the reservation between stations A and B has been terminated.

A DATA frame is composed of a robust header followed by a frame body. The control frames do not have a frame body, with the exception of the RTS frame. The robust header is maximum repetition coded with RRmax for maximum reach and it always contains the frame type (FT) and the reservation ID (RID) in order that any station within reach may correctly detect and react to the frame. Further, the DATA robust header contains the block length (BL) of the frame body and the repetition rate (RR) with which to encode the frame body. CTS, ACK and EOBC frames also contain a recommended repetition rate (RR*) which is extracted by the requestor of the reservation with which to encode the DATA frame body. DATA packets sent within a reservation are referred to as RDATA. DATA packets that are not sent within a reservation are denoted as unreserved DATA, and are referred to as UDATA. DATA frames and the RTS frame also have a frame body which contains the destination address (DA) of the station to which the frame is directed, the source address (SA) of the station sending the frame, the information/data field (DATA frames only), and the CRC check sum of the frame body.

The protocol in application Ser. No. 08/664,718 is designed for a directed infrared (IR) communications channel. This means that there will be stations that can only detect a frame flowing from station A to station B or from station B to station A. A station C that can only detect frames flowing from station A to station B is said to be a hidden node, or blind node, to station B with respect to station A; i.e., both station C and station B are "looking" at station A and therefore can not "see" each other. The RTS/CTS frame exchange is meant to solve the hidden node problem; i.e., if station C does not detect the RTS frame from station B to station A, it will detect the CTS reply from station A.

In order to provide for a speedy calculation of RR* and selection of RR* and RR, the present invention provides an architecture which accommodates such a speedy process.

Referring now to the drawings, and more particularly to FIG. 1, there is shown the RMM module 11 and the RCM module 12 sandwiched between the hardware MAC 13 and the MAC driver 14. The hardware MAC 13 provides the interface between the modem 15 and the RMM module 11 and RCM module 12. This sandwich structure makes the architecture as open as possible by not restricting the RCM and RMM modules to either software or hardware. In fact, the architecture may be translated into a number of different implementations depending on budget, desired performance and available real estate.

In general, the RCM module 12 is used in the receiving station and the NP stations. The RMM module 11 has two parts and is used in all stations. These parts are the RR* Table 111 and the RR Table 112. The RR* Table 111 is accessed by the receiving station, and the RR Table 112 is accessed by the transmitting station. Both tables may be updated at any time regardless of the station's mode.

In FIG. 1, "Put{data1,data2, . . . }" and "Get{data1,data2, . . . }" from the hardware MAC 13 to the RCM and RMM modules are simple functions, or macros, that write and read, respectively, "data1,2, . . . " to and from registers within the RCM and RMM modules. For example, before the hardware MAC 13 can launch a DATA frame, it must first issue the function call "Get{RR,DA}" to the RR table 112 in the RMM module 11 (see lower right corner of FIG. 1) in order to retrieve the most up-to-date value of the repetition rate, RR, with which to encode the frame body. DA is used to find the RR associated with the destination address (DA). In the same fashion, the hardware MAC 13 must issue the function call "Put{RR*,DA}" to the RR table 112 in the RMM module 11 when the hardware MAC receives a frame which demands the MAC to extract the RR* from the frame. The RMM module 11 uses the (RR*, DA) pair to update the RR Table 112. Similarly, the MAC driver 14 issues "Put{data1,data2, . . . }" and "Get{data1, data2, . . . }" function calls to the RMM module 11. These include "Put{RR,RR$_{def}$,LS,DA}" and "Get{RR*,DA}" function calls to the RR table 112 and a "Put{RR*,RR*$_{def}$LS, DA}" function call to the RR* table 111, where RR$_{def}$ and RR*$_{def}$ are default values. A "Put{data1,data2, . . . }" function call from either the hardware MAC 13 or the MAC driver 14 is time stamped by time stamp functions 113, 114 and 115.

As is described in more detail hereinbelow, the RCM module 12 receives "Put{data1,data2, . . . }" function calls from both the hardware MAC 13 and the MAC driver 14. More particularly, when the hardware MAC 13 receives a frame, it issues a "Put{FT,RR,BL,SA,CRC,SEC,P}" function call to the RCM module 12, thereby writing the data extracted from the received frame to the RCM module 12. The MAC driver 14 issues a "Put{SER* Algorithm, and Inspection Routine, M}" call to the RCM module 12 and, as described in more detail below, the RCM module 12 performs the RR* rate calculation and, after performing the RR* rate calculation, makes a "Put{RR*,DA}" function call to the RR* table 111 of the RMM module 11 and this, in turn, is time stamped by time stamp function 116.

Figure 2:
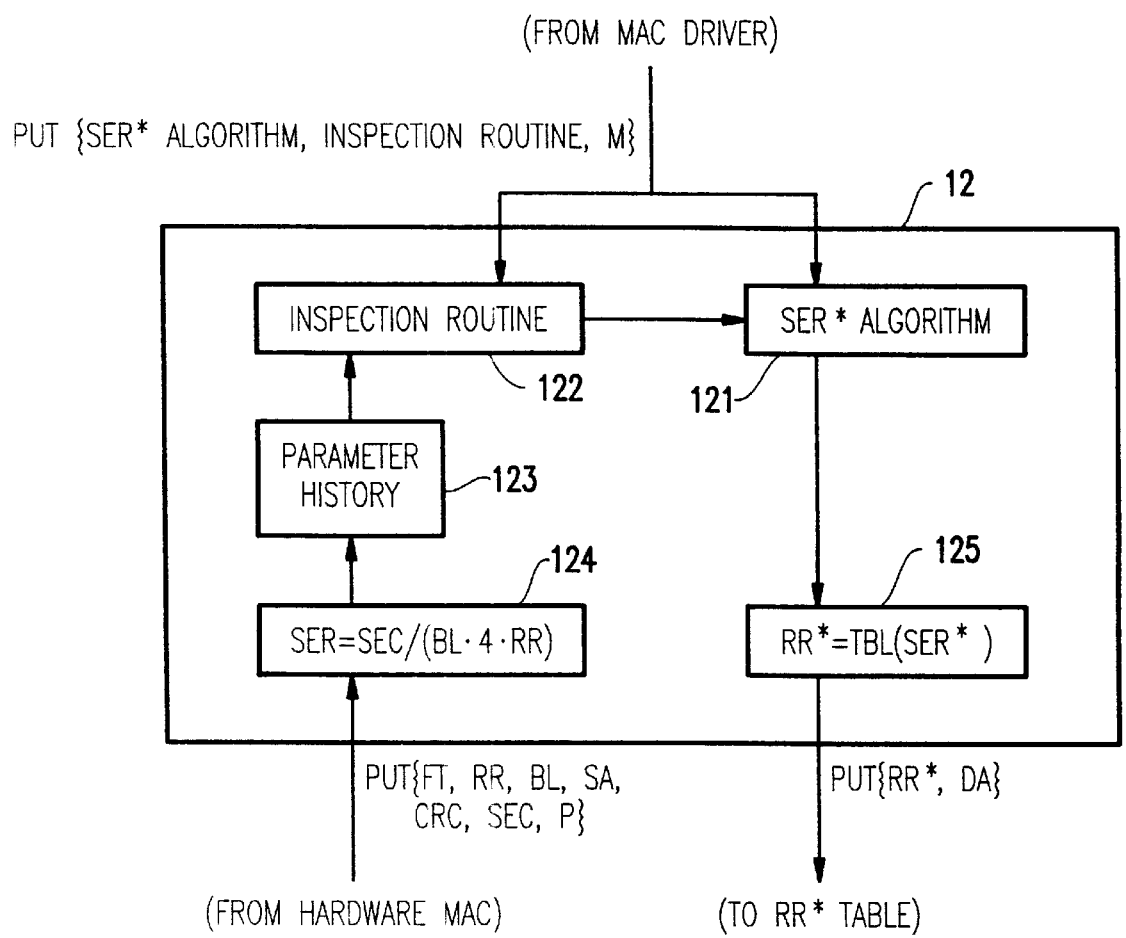
FIG. 2 is a block diagram showing in more detail the Rate Calculation Module of FIG. 1.

FIG. 2 shows in more detail the implementation of the RCM 12 in FIG. 1. The appropriate algorithm for calculation of SER* and the appropriate routine, M, for inspection of the last received packet and signal parameters are respectively selected in the SER* Algorithm function 121 and the Inspection Routine function 122 by a "Put" function call from the MAC driver. This function call also informs the RCM 12 how many entries from the Parameter History 123 list to include in the SER* calculation. Whenever a data frame is received from which the relevant parameters are extracted, such as FT, RR, BL, etc., the hardware MAC passes these parameters to the RCM with a "Put" function call. Whenever "Put{FT,RR,BL, . . . }" is issued by the hardware MAC, the first thing the RCM does is to calculate the SER value. In Step 2, having calculated the SER value, this value is then stored in the Parameter History 123 list together with the other, or some of the other, parameters; i.e., FT, RR, BL, etc. The content and size of the Parameter History 123 list is dependent on the control parameters passed to the RCM from the MAC driver; i.e., the calculation algorithm and the number of earlier detected and calculated parameters to include in the calculation. The calculation algorithms are explained later. Before SER* may be calculated by the selected SER* Algorithm in function 121, the RCM Inspection Routine 122 first inspects some of the packet and signal parameters to make a more educated guess as to what may have caused a certain SER value. The Inspection Routine is explained later in the embodiment. It is possible that the Inspection Routine determines the RR* should not be calculated, in which case the calculation may be terminated without updating the RR* Table 111 (FIG. 1). Next, the SER* can be calculated using the values of SER, FT, RR, BL, etc., from the Parameter History 123 list. Having calculated SER*, RR* can now be found by a table lookup using table 125. Finally, the RR* value from table 125 is passed to the RR* table 111 in the RMM 11, shown in FIG. 1.

In the following, the preferred implementation of the RCM module 12 is described in terms of SER* Algorithms and Inspection Routines. Next, the preferred implementation of the RMM module 11 is described. It is noted that depending on how the RR* is calculated, it may be required that the RCM module 12 is implemented in hardware for time critical reasons. However, since the issue of where the RCM module 12 should be located also depends on the location, or partitioning, of the RMM module 11, we shall limit the discussion of the RCM embodiment to the SER* Algorithm and the Inspection Routine and return to the issue of the location of the RCM in the discussion of the RMM embodiment.

Embodiments of Rate Calculation Module (RCM)

There are a number of alternatives for calculation of the recommended rate of transmission, RR*, that a station A that is transmitting to a station B should be using when sending DATA to station A.

When the $n^{th}$ frame is received, the modem determines the number of invalid symbols, which we refer to as the Symbol Error Count (SEC$_n$). Note, that SEC is identical to the Link Quality Parameter (LQP) in application Serial No. 08/664, 718. Having SECn and the symbol count of the frame body (which is equal to BLn×4×RRn), the Symbol Error Rate (SER$_n$), which is a measure of the link quality, can be determined as $$SER_n = \frac{SEC_n}{(BL_n \times 4 \times RR_n)}.$$

The goal is to calculate expected Symbol Error Rate (SER*) from SER$_n$ and previous values of SER. Once SER* has been calculated, the recommended rate of transmission, RR*, for transmission of DATA from station B to station A is determined by a table lookup; i.e., RR*=TBL(SER*), where TBL(x) is the table lookup function. Table 1 is an example of the TBL(x) lookup table. Once SER* has been calculated, then the RR* value can be found from the table.

TABLE 1

TBL(x) Lookup Table

| SER* | RR* |
|---|---|
| $10^{-6}$, SER* $\leq 10^{-5}$ | 1 |
| $10^{-5}$, SER* $\leq 10^{-4}$ | 2 |
| $10^{-4}$, SER* $\leq 10^{-3}$ | 4 |
| $10^{-3}$, SER* $\leq 10^{-2}$ | 8 |
| $10^{-2}$, SER* $\leq 10^{-1}$ | 16 |

The entries in the left column of the table will typically be governed by what constitutes maximum acceptable value of the symbol error rate in order for the link to perform satisfactorily. This has been disclosed by Gfeller et al. in application Ser. No. 08/664,718, supra.

The calculation of the expected symbol error rate SER* may be dependent on a number of different channels, packet and station parameters; i.e., $$SER^*=f(SER_{1\to n}, T_{1\to n}, FT_{1\to n}, P_{1\to n}, BL_{1\to n}, RR_{1\to n}, SA_{1\to n}, TP_{1\to n}, CAT_{1\to n}) \quad (1)$$

where $SER_i$ is the measured symbol error rate of the $i^{th}$ received frame and $i \in [1;n]$, $T_i$ is the time of reception of the $i^{th}$ received frame, $FT_i$ is the frame type of the $i^{th}$ received frame, $P_i$ is the received power level of the $i^{th}$ frame, $BL_i$ is the block length of the $i^{th}$ received frame, $RR_i$ is the repetition rate of the $i^{th}$ received frame, $SA_i$ is the source address of the station sending the $i^{th}$ frame, $TP_i$ is the throughput from station $SA_i$, $CAT_i$ is the average channel access time experienced at station $SA_i$, and n is the number of the last received frame.

The following describes four different embodiments for calculation of SER* in Equation 1.

The first embodiment of the SER* Algorithm uses the $1^{st}$ and $2^{nd}$ moments of SER. In practicality, a limited number, M, of previously received frames will be used for calculation of SER*. The following algorithm is used:

$$SER^*=\mu(M)+\alpha \cdot \sigma(M) \quad (2)$$

where $$\mu = \frac{1}{M}\sum_{i=0}^{M-1} SER_{n-i}$$

is the mean or average value of SER and $$\sigma = \sqrt{\frac{1}{M}\sum_{i=0}^{M-1} SER_{n-1}^2 - \mu^2}$$

is the deviation from the mean value of SER (note that the first term under the square-root sign is the second moment of SER) and $\alpha$ is a fudge factor. This method of predicting SER* will always yield values of SER* which are greater than $\mu$.

Equation 2 can be enhanced by allowing the user to indicate whether he or she is expecting a quite, noise, mobile, interfering environment or a combination thereof. The idea is to make the fudge factor dependent on the user's input; i.e., $\alpha=\alpha(\text{environment})$. For example, if the user indicates the environment to be quiet, then $\alpha=1$. Or if the environment is expected to be noisy (e.g., strong sun light) or mobile, then $\alpha=2$ to compensate for the anticipated larger fluctuations in SER. Or if the environment is expected to be interfering, then $\alpha=3$ to compensate for the anticipated much stronger fluctuations in the SER values due to collisions.

The drawback of the algorithm in Equation 2 is that it has no time aspect to it, and it is most useful for situations where $\mu$ and $\alpha$ are representative of the steady state values of the statistical variations of the SER. However, wireless devices are inherently mobile and therefore their link properties will vary in time. In other words, their link properties may behave in a non-ergodic fashion over a "short" period of time.

The above Equation 2 would produce better results within a short period of time, where the channel conditions may only be changing slowly, than it would over a long period of time where the channel conditions may vary significantly. For example, say that M=10, then if the station receives ten DATA packets from another station within a fraction of a second, it is quite unlikely that the channel conditions would have changed within such a short time period. If on the other hand the station is receiving the ten DATA packets spread over ten minutes, it seems much more likely that the channel conditions would have changed over that long a time interval. Thus, in the second embodiment for calculation of SER*, a time dependency shall be introduced.

The second embodiment of the SER* Algorithm uses the age of previous measurements. In this embodiment, each measured SER is weighted by a function of its age, $f_{A,n-i}=f_A(T_n-T_{n-i})$. Assuming an exponentially decaying age dependency of $$f_{A,n-i} = e^{-\frac{(T_n-T_{n-i})}{\tau}}$$

where $\tau$ is the decay time constant and incorporating the weight approach into Equation 2, the following expression can be derived of calculation of SER*:

$$SER^*=\mu(M, f_{A,n-i})+\alpha \cdot \sigma(M, f_{A,n-i}) \quad (3)$$

where $$\mu = \frac{\sum_{i=0}^{M-1} e^{-\frac{(T_n-T_{n-i})}{\tau}} \cdot SER_{n-i}}{\sum_{i=0}^{M-1} e^{-\frac{(T_n-T_{n-i})}{\tau}}}$$

and $$\sigma = \sqrt{\frac{\sum_{i=0}^{M-1} e^{-\frac{(T_n-T_{n-i})}{\tau}} \cdot SER_{n-i}^2}{\sum_{i=0}^{M-1} e^{-\frac{(T_n-T_{n-i})}{\tau}}} - \mu^2}$$

Equation 3 only partly addresses the concerns with Equation 2. Equation 3 will still work best with an ergodic process or at least a slowly evolving process. If, however, the SER suddenly jumps within the duration of the decay period $\tau$, it may either be a good idea to apply a lot of weight or very little weight on the latest measurement depending on the data frame type.

In the third embodiment of the SER* Algorithm, provision is made for applying more or less impact to a specific measurement. The third embodiment uses frame type (FT) and CRC check of the latest SER measurement. In the case where the SER suddenly jumps, i.e., within the decay period $\tau$, it becomes necessary to make the calculation of SER* dependent on the frame type. This is done by the introduction of an impact variable, IMP, which ranges from zero to infinite. Average impact is denoted as IMP=1. However, if a certain measurement of SER demands that SER* adjusts quickly to the new channel condition, IMP may be increased to a larger value for that SER value. In the same fashion, IMP may also be reduced if less importance should be put on a measurement, say if the measurement is deemed an exception. The following algorithm for calculation of SER* is used:

$$SER^* = \mu(M, f_{A,n-i}, IMP_i) + \alpha \cdot \sigma(M, f_{A,n-i}, IMP_i) \qquad (4)$$

where $$\mu = \frac{\sum_{i=0}^{M-1} e^{-\frac{(T_n - T_{n-i})}{\tau}} \cdot IMP_i \cdot SER_{n-i}}{\sum_{i=0}^{M-1} e^{-\frac{(T_n - T_{n-i})}{\tau}} \cdot IMP_i}$$

and $$\sigma = \sqrt{\frac{\sum_{i=0}^{M-1} e^{-\frac{(T_n - T_{n-i})}{\tau}} \cdot IMP_i \cdot SER_{n-i}^2}{\sum_{i=0}^{M-1} e^{-\frac{(T_n - T_{n-i})}{\tau}} \cdot IMP_i} - \mu^2}$$

The third embodiment of the SER* Algorithm may be used in conjunction with the following embodiment of the Inspection Routine of FIG. 2. We shall distinguish between unreserved data packets (UDATA) and reserved data packets (RDATA).

A UDATA packet is not protected by an RTS/CTS reservation. A UDATA packet is launched solely on the basis of an available channel. If the channel is free, the UDATA packet is sent. However, all the blind nodes to the transmitter of the UDATA packet can at anytime launch a packet of their own since they are not aware of the transmission of the UDATA packet. Thus, a collision at the receiver is not an unlikely event when sending UDATA packets, and this would be the cause of a sudden increase in the SER of a UDATA packet. In this situation, there is not much the receiving station can do in terms of returning a new value of RR* back to the transmitting station since the receiving station does not know if the next data packet is going to be a reserved or unreserved data packet. Nor does the receiving station know when the next packet might be sent. If the next data packet is a UDATA packet, then it is not unlikely that another collision would happen wherefore RR* should be increased. But if the next data packet is a reserved data packet, then it is very unlikely that there will be a collision, in which case RR* should remain the same. On the other hand, the collision could also be due to disparity at the physical layer.

Disparity is the phenomenon where a station A may hear another station C, but station C can not hear station A. Thus, station A may set up a reservation with a station B which goes undetected by station C. Therefore, station C thinks that the channel is available and may launch frames at any time that will collide with frames from station B at station A. This means that the probability of a collision due to disparity is independent of the frame type.

It is proposed that with respect to UDATA, that the receiver of the UDATA packet ignores the SER of the UDATA packet and does not attempt to return RR* based on the UDATA packet. Higher layers in the transmitter are capable of adjusting RR of the UDATA packet if it does not get an acknowledgment at the LC level. Another reason for not attempting to adjust RR* is the lack of a speedy return mechanism to the transmitter. A speedy return mechanism only exists for reserved data frame types. Thus, by the time RR* is returned to the transmitter, it is not unlikely that the RR* value is already too "old". Further, note that if the UDATA packet has a CRC error, the packet is completely ignored because neither the DA nor the SA of the frame body can be trusted. Thus, the receiver of the UDATA packet can not make a link association with the SER.

In summary, if $ST_n$=UDATA, then the SER of the UDATA packet is simply ignored; i.e., $IMP_n$=0.

An RDATA packet is protected by an RTS/CTS reservation. This is why collisions within reservations will be extremely rare except if there is disparity at the physical layer as described under the UDATA section. Thus, should SER of an RDATA packet suddenly jump within the decay rate $\tau$, it may be assumed that it is due to a collision, or it might be due to a sudden change in the link property, such as a sudden increase in the angle between two communicating devices of if a lamp is switched on. Should any of these situations arise, it would be best to put a lot of weight on the latest measurement, i.e., $IMP_n \gg 1$, to enable fast adjustment to the new channel conditions.

The rapid adjustment is necessary because the next data packet is likely to be error prone too. If an acknowledged data frame type is being used and if the RCM module is implemented in hardware, it is possible to adjust RR of the next data packet by returning RR* in the ACK response frame. Note that if the CRC check was not OK, the ACK frame is not returned to the transmitter, in which case the transmitter will terminate the reservation by sending the EOB frame. Then the receiver can return the RR* in the EOBC reply.

In the above, the term "jump" has been used in a generic sense and may be loosely interpreted as satisfying the condition $$\frac{SER_n}{SER_{n-1}} \geq JUMP.$$

In a practical implementation, the value of JUMP might depend on factors such as the relative age of the comparison, $$\frac{T_n - T_{n-1}}{\tau}$$

and the statistical accuracy of $SER_n$ and $SER_{n-1}$.

The above embodiments may also be used in conjunction with the following embodiment of the Inspection Routine which takes into consideration the average received power level, P, as detected during the reception of a packet. If the received power level could be measured, for example by the automatic gain control (AGC) signal, and coupled with the knowledge of the maximum and minimum noise levels at the receiver input, it is possible to more accurately determine if a certain change in the SER value is due to a collision or due to a change in the received power level. For example, if SER is large and P is large at the same time, it is likely that the reason for the large SER value is due to a collision since a large power value usually means zero errors. This might be particularly useful for UDATA where it was earlier suggested not to do anything, because of the uncertainty in knowing what caused the particular SER level. For example, knowing that a certain SER value was not due to a collision is a sign that the link is degrading due to a reduction in signal-to-noise (SNR) ratio which would be worth while informing the sender about. However, if the SER value is deemed to be caused by a collision, then there is really no need to inform the sender about another RR* value because of the uncertainty of the chance of another collision. The following pseudocode is a proposed embodiment for the Inspection Routine in FIG. 2 for handling UDATA packets:

```
if (FT==UDATA)
if (SER>SERMax(RR))
{
    if (ReceivedPowerLevel<MaxPowerLevel(RR))
    { // SER increase due to reduced signal level.
        IMP=1;
        Calculate(SER);
        ReportRateToSender(RR*);
    }
    else
    {// SER increase due to collision.
        IMP=0;
    }
}
if (SER<SERMin(RR))
{
    if (ReceivedPowerLevel>MinPowerLevel (RR))
    { // SER reduction due to increased signal level
        IMP=1;
        CalcRate(SER);
        ReportRateToSender(RR*);
    }
    else
    { // This can never happen.
    }
}
{
```

Another preferred embodiment of the Inspection Routine is to keep probability distribution functions (PDF) of the SER values on a per station address (SA) basis. Such PDFs would be useful for the rate calculation as they show the spreading of a certain station's SER values over a certain period of time, or over a certain number of packets. For example, if a certain station's SER values are either very small or very large, then it may be close to impossible to predict by any of the previously mentioned embodiments what the next rate should be, and the receiving station may be better off simply suggesting to the sending station to send all data packets at RRmax based on the PDF information.

The fourth embodiment of the SER* Algorithm is based on tracking the SER values and attempting to predict what the next SER value will be based on a guess of when the next data packet will arrive. We propose the following algorithm:

$$SER^* = SER_n + \frac{SER_n - SER_{n-1}}{T_n - T_{n-1}} \cdot (T_{n+1}(RR^*) - T_n) \quad (5)$$

In this algorithm, there are two unknown values, namely, $T_{n+1}$ and RR*. As indicated in the equation, Tn+1 is dependent on RR*. This is the case since the time of the arrival of the $(n+1)^{th}$ packet will clearly depend on the RR* value returned to the sending station as well as the packet size. Since RR* is a function of SER*, and SER* is also a function of RR*, this problem of finding the steady-state value of RR* is a matter of calculating SER* for different values of RR* until TBL(SER*) yields the same value of RR* that was used to calculate SER*.

Embodiment of Rate Management Module (RMM)

As seen from FIG. 1, the rate management module (RMM) 11, manages two tables, namely, the RR* Table 111 and the RR Table 112. The RR* Table 111 may be split into a fast Active RR* (ARR*) Table which is implemented in hardware and a slower Full RR* (FRR*) Table. The ARR* table contains N entries as illustrated in Table 2 below.

TABLE 2

| Active RR* Table | | | | | |
|---|---|---|---|---|---|
| DA | RID | Time Stamp, TS | Life Span, LS | New Repetition Rate, RR* | Default Repetition Rate, RR*$_{DEF}$ |
| $DA_1$ | $RID_1$ | $TS_1$ | $LS_1$ | $RR^*_1$ | $RR^*_{DEF,1}$ |
| $DA_2$ | $RID_2$ | $TS_2$ | $LS_2$ | $RR^*_2$ | $RR^*_{DEF,2}$ |
| ... | ... | ... | ... | ... | |
| $DA_N$ | $RID_N$ | $TS_N$ | $LS_N$ | $RR^*_N$ | $RR^*_{DEF,N}$ |

Each ARR* table entry is composed of a Destination Address (DA) and an associated RID (if any), the last calculated RR* value associated with the DA, the Time Stamp (TS) of the RR* value, the Life Span (LS) of the RR* value, and a default value of the repetition rate ($RR^*_{DEF}$) to be used if RR* is outdated according to TS+LS. The RID is used in cases where the received frame does not contain a DA. By default, the AAR* table will have a limited size. The FRR* table may be implemented in software and is intended to maintain a more extensive record of RR* values associated with different DAs. Whenever the RCM has calculated a new RR* value, it modifies the particular entry in the FRR* and ARR* tables, using the Put{RR*,DA} primitive as shown in FIG. 1.

Similarly, the RR Table 112 may be split into a fast Active RR (ARR) Table which is implemented in hardware and a slower Full RR (FRR) Table. The ARR table contains M entries as illustrated in Table 3 below.

TABLE 3

| Active RR Table | | | | | |
|---|---|---|---|---|---|
| DA | RID | Time Stamp, TS | Life Span, LS | New Repetition Rate, RR | Default Repetition Rate, RR$_{DEF}$ |
| $DA_1$ | $RID_1$ | $TS_1$ | $LS_1$ | $RR_1$ | $RR_{DEF,1}$ |
| $DA_2$ | $RID_2$ | $TS_2$ | $LS_2$ | $RR_2$ | $RR_{DEF,2}$ |
| ... | ... | ... | ... | ... | |
| $DA_N$ | $RID_N$ | $TS_N$ | $LS_N$ | $RR_N$ | $RR_{DEF,N}$ |

As seen, the ARR table is nearly identical to the ARR* table, and the explanation to the table variables are the same as for the ARR* table. The FRR table may be implemented in software and is intended to maintain a more extensive record of the RR value associated with different DAs.

The RMM module 11 time stamps the entries at the time the entries are modified. In a way, the ARR* and ARR tables can be compared to the cache memory (fast access) in a computer. Cache memory only contains the most recently used code and data and has a limited size. If the cache fills up, the older entries in the cache are written into main memory. The FRR* and FRR tables may in turn be compared to main memory (slower access) or secondary memory (much slower access).

With the ARR* and ARR tables being implemented in hardware, it is possible to adjust the rate of the very first data packet. It works as follows. When a station B is ready to make a reservation attempt with a station A, i.e., station B is ready to launch the RTS frame, station B copies the RR value of the DA entry in the ARR table into the RR field of the RTS frame. If the RR value is outdated according to TS+LS, it copies the $RR_{DEF}$ instead. When station A receives the RTS frame from station B, station A examines the SA field in the RTS frame and checks if it matches any of the DAs in the ARR* table. If a match is found and the RR* value is not too old, the RR* value is copied into the RR* field of the CTS reply frame which is then sent to station B. Station B in turn extracts the RR* value from the RR* field and replaces the RR value in the ARR table with the RR* value. Then when station B sends the first DATA frame it will copy the new RR value from the ARR table into the RR field of the RDATA frame. When station A then receives the RDATA frame it will go through the same procedure as when it received the RTS frame, except now station A will pass packet parameters, link quality parameter (LQP), SA, etc., derived from the RDATA frame to the RCM (i.e., the "Put{Packet Parameters,LQP,DA}" function in FIG. 1) which, as described in the previous sub-section about the RCM module 112 embodiment, will use these packet and link parameters to calculate a new value of the RR* and save it in the ARR* table so that before station A sends out the ACK reply, if required the newly calculated RR* value can be copied into the RR* field of the ACK reply frame. In turn, station B processes the ACK frame in the same fashion it processed the CTS frame. This goes on until station A receives the EOB which is treated in the same fashion as the RTS and RDATA, except the EOB frame only has the RID which identifies its sender. Station A finally copies the RR* associated with the RID of the EOB frame into the RR* field of the EOBC reply frame and sends the EOBC to station B.

If station A receives an RTS, RDATA or EOB frame and the SA of the received frame (or the RID) is not present in the table, i.e., SA!=DA1,2, . . . ,N, the RR* field in the response frame is set to "undefined". When the requesting station B receives the reply frame and determines that RR* is "undefined", station B will copy the previously used RR value from the ARR table, or if the RR value is outdated it will copy the $RR_{DEF}$ instead.

In principle, the ARR* and ARR tables may be updated at any time, even outside a reservation. With the RMM implemented in hardware, it becomes possible for a non-participating (NP) station to evaluate links to itself by measuring the number of symbol errors in data packets destined to other stations on the channel. This sort of implementation is very desirable because a significant part of a station's life is spent as a non-participant; i.e., as an observer of other traffic on the channel. If RCM and RMM are implemented in hardware, the NP station does not have to involve the software system in order to evaluate link performance as this can now be confined to hardware. If one chose to implement the RCM module 12 in software, the station would constantly be interrupting the software system for the sake of evaluating link performance which would have a highly undesirable effect on the system performance. The benefit of this sort of continuous evaluation of the performance will provide the NP station with the most accurate and up-to-date values of RR*. Thus, whenever the former NP station detects an RTS destined for itself, it will instantaneously be able to inform the requester station about the correct value of RR*.

While the invention has been described in terms of four preferred embodiments, those skilled in the art will recognize that the invention can be practiced with modification within the spirit and scope of the appended claims.

What is claimed is:

1. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on packet lengths and one or more previous measurements on the link quality between the receiving station and one other station; and returning information on the calculated rate to said one other station.

2. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on one or more previous measurements on the link quality between the receiving station and one other station, wherein the rate calculation takes into consideration the packet types; and returning information on the calculated rate to said one other station.

3. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on one or more previous measurements on the link quality between the receiving station and one other station, and on measured signal strength; and returning information on the calculated rate to said one other station.

4. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on one or more previous measurements on the link quality between the receiving station and one other station, and on the age of past measurements; and returning information on the calculated rate to said one other station.

5. In a communication network having a plurality of stations communicating with each other via packets whereby the rate of communication between any two of said stations can be selected dynamically by a receiving station, a method of dynamic rate selection implemented at said receiving station comprising the steps of:
- measuring a link quality over a period of time between the receiving station and one other station on a per packet basis;
- calculating said rate based on one or more previous measurements on the link quality between the receiving station and one other station, and on the age of past measurements; and
- returning information on the calculated rate to said one other station,
- wherein the step of calculating is dependent on a second moment of a number of measurements.

6. The method of dynamic rate selection recited in claim 5 wherein the measure of link quality is symbol error rate (SER) and an expected symbol error rate (SER*) for M measurements is calculated as SER*=$\mu$(m)+$\alpha\cdot\sigma$(M) where $$\mu = \frac{1}{M}\sum_{i=0}^{M-1} SER_{n-i}$$

is the mean or average value of SER and $$\sigma = \sqrt{\frac{1}{M}\sum_{i=0}^{M-1} SER_{n-i}^2 - \mu^2}$$

is the deviation from the mean value of SER, where the first term under the square-root sign is the second moment of SER, and $\alpha$ is a fudge factor.

7. The method of dynamic rate selection recited in claim 5 wherein the measure of link quality is symbol error rate (SER) and each measured SER is weighted by a function of its age.

8. The method of dynamic rate selection recited in claim 7 wherein the age function is expressed as $$f_{A,n-i} = e^{-\frac{(T_n - T_{n-i})}{\tau}}$$

where $\tau$ is the decay time constant and an expected symbol error rate (SER*) is calculated as SER*=$\mu$(M, $f_{A,n-i}$)+$\alpha\cdot\sigma$(M, $f_{A,n-i}$) where $$\mu = \frac{\sum_{i=0}^{M-1} e^{-\frac{(T_n - T_{n-i})}{\tau}} \cdot SER_{n-i}}{\sum_{i=0}^{M-1} e^{-\frac{(T_n - T_{n-i})}{\tau}}}$$

is the mean or average value of SER and $$\sigma = \sqrt{\frac{\sum_{i=0}^{M-1} e^{-\frac{(T_n - T_{n-i})}{\tau}} \cdot Ser_{n-i}^2}{\sum_{i=0}^{M-1} e^{-\frac{(T_n - T_{n-i})}{\tau}}} - \mu^2}$$

is the deviation from the mean value of SER, where the first term under the square-root sign is the second moment of SER, and $\alpha$ is a fudge factor.

9. The method of dynamic rate selection recited in claim 7 wherein a calculation of expected symbol error rate (SER*) is dependent on frame type.

10. The method of dynamic rate selection recited in claim 9 SER* is calculated as SER*=$\mu$(M, $f_{A,n-i}$, $IMP_i$)+$\alpha\cdot\sigma$(M, $f_{A,n-i}$, $IMP_i$) where IMP is an impact variable, $$\mu = \frac{\sum_{i=0}^{M-1} e^{-\frac{(T_n - T_{n-i})}{\tau}} \cdot IMP_i \cdot Ser_{n-i}}{\sum_{i=0}^{M-1} e^{-\frac{(T_n - T_{n-i})}{\tau}} \cdot IMP_i}$$

is the mean or average value of SER and $$\sigma = \sqrt{\frac{\sum_{i=0}^{M-1} e^{-\frac{(T_n - T_{n-i})}{\tau}} \cdot IMP_i \cdot Ser_{n-i}^2}{\sum_{i=0}^{M-1} e^{-\frac{(T_n - T_{n-i})}{\tau}} \cdot IMP_i} - \mu^2}$$

is the deviation from the mean value of SER, where the first term under the square-root sign is the second moment of SER, and $\alpha$ is a fudge factor.

11. The method of dynamic rate selection recited in claim 5 wherein the measure of link quality is symbol error rate (SER) and SER values are tracked to predict an expected symbol error rate (SER*).

12. In a communication network having a plurality of stations communicating with each other via packets whereby the rate of communication between any two of said stations can be selected dynamically by a receiving station, a method of dynamic rate selection implemented at said receiving station comprising the steps of:
- measuring a link quality over a period of time between the receiving station and one other station on a per packet basis;
- calculating said rate based on one or more previous measurements on the link quality between the receiving station and one other station and on an average of a number of measurements; and
- returning information on the calculated rate to one other station.

13. In a communication network having a plurality of stations communicating with each other via packets whereby the rate of communication between any two of said stations can be selected dynamically by a receiving station, a method of dynamic rate selection implemented at said receiving station comprising the steps of:
- measuring a link quality over a period of time between the receiving station and one other station on a per packet basis;
- calculating said rate based on one or more previous measurements on the link quality between the receiving station and one other station and on a probability distribution function of the measured link quality; and
- returning information on the calculated rate to said one other station.

14. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on one or more previous measurements on the link quality between the receiving station and one other station and on an expected channel environment; and returning information on the calculated rate to said one other station.

15. In a communication network having a plurality of stations communicating with each other via packets whereby the rate of communication between any two of said stations can be selected dynamically by a receiving station, a method of dynamic rate selection implemented at said receiving station comprising the steps of:

measuring a link quality over a period of time between the receiving station and one other station on a per packet basis;

calculating said rate based on one or more previous measurements on the link quality between the receiving station and one other station and on a rate of change in the measured link quality; and returning information on the calculated rate to said one other station.

16. A communication network comprising:

a plurality of stations communicating with each other via packets based on a dynamic repetition rate selection, each said station including means for measuring a link quality between the receiving station and a transmitting station on a per packet basis;

means for calculating a repetition rate based on one or more previous measurements on the link quality between the receiving and transmitting stations, wherein the means for calculating is implemented in hardware as a rate calculation module (RCM) and each said station further includes a rate management module (RMM) having one or more repetition rate tables containing entries composed of a repetition rate (RR), a calculated repetition rate (RR*), a time stamp value, and a default repetition rate value; and means for returning information on a calculated repetition rate from the receiving station to said one other station, whereby the rate of communication between any two of said stations in the network can be selected dynamically by a receiving station.

17. A communication network comprising:

a plurality of stations communicating with each other via packets based on a dynamic repetition rate selection, each said station including means for measuring a link quality between the receiving station and a transmitting station on a per packet basis;

means for calculating a repetition rate based on one or more previous measurements on the link quality between the receiving and transmitting stations, wherein the means for calculating is implemented in hardware as a rate calculation module (RCM) and each said station further includes a rate management module (RMM) having one or more repetition rate tables containing entries composed of a repetition rate (RR), a calculated repetition rate (RR*), a time stamp value, and a default repetition rate value; and means for returning information on a calculated repetition rate from the receiving station to said transmitting station, whereby the rate of communication between any two of said stations in the network can be selected dynamically by a receiving station, wherein the calculated repetition rate RR* is returned to the transmitting station and the transmitting station may select RR* as the actual repetition rate RR for transmitting information to the receiving station.

18. The communication network recited in claim 17 wherein the calculated repetition rate RR* is determined by a table lookup based on a computed expected symbol error rate (SER*).

19. The communication network recited in claim 18 wherein values stored in the RMM module are dynamically updated.

20. The communication network recited in claim 19 further comprising time stamp means for time stamping values stored in said RMM module.

* * * * *

UNITED STATES PATENT AND TRADEMARK OFFICE
CERTIFICATE OF CORRECTION

PATENT NO. : 6,252,854 B1
DATED : June 26, 2001
INVENTOR(S) : Hortensius et al.

Page 1 of 1

It is certified that error appears in the above-identified patent and that said Letters Patent is hereby corrected as shown below:

<u>Column 7,</u>
Line 50, change "
$$\sigma = \sqrt{\frac{1}{M}\sum_{i=0}^{M-1} SER_{n-1}^2 - \mu^2}$$
"

to $$-- \sigma = \sqrt{\frac{1}{M}\sum_{i=0}^{M-1} SER_{n-i}^2 - \mu^2} --.$$

Signed and Sealed this

Fifth Day of February, 2002

Attest:

JAMES E. ROGAN
*Director of the United States Patent and Trademark Office*

*Attesting Officer*